(12) United States Patent  (10) Patent No.: US 7,775,347 B2
Cornelissen  (45) Date of Patent: Aug. 17, 2010

(54) ASSEMBLY FOR HINGEDLY COUPLING PARTS OF A CONVEYOR, AND HINGE PIN

(75) Inventor: Leonardus Adrianus Catharinus Cornelissen, The Hague (NL)

(73) Assignee: Rexnord Flattop Europe B.V., 'S-Gravenzande (NL)

( * ) Notice: Subject to any disclaimer, the term of this patent is extended or adjusted under 35 U.S.C. 154(b) by 263 days.

(21) Appl. No.: 11/597,448

(22) PCT Filed: May 27, 2005

(86) PCT No.: PCT/NL2005/000390

§ 371 (c)(1), (2), (4) Date: Aug. 7, 2008

(87) PCT Pub. No.: WO2005/115883

PCT Pub. Date: Dec. 8, 2005

(65) Prior Publication Data

US 2008/0296132 A1  Dec. 4, 2008

(30) Foreign Application Priority Data

May 27, 2004  (NL) .................................... 1026284

(51) Int. Cl.
*B65G 17/06*  (2006.01)
(52) U.S. Cl. .................. 198/853; 198/850; 198/851; 198/852
(58) Field of Classification Search ................ 198/850, 198/851, 852, 853
See application file for complete search history.

(56) References Cited

U.S. PATENT DOCUMENTS 2,852,129 A * 9/1958 Conner ..................... 198/853

(Continued)

FOREIGN PATENT DOCUMENTS

EP  0 787 663  8/1997

(Continued)

OTHER PUBLICATIONS

International Search Report corresponding to PCT/NL2005/000390, under date of mailing of Aug. 29, 2005.

*Primary Examiner*—Douglas A Hess
(74) *Attorney, Agent, or Firm*—Quarles & Brady LLP (57) ABSTRACT

An assembly for hingedly coupling parts of a conveyor comprising a first conveyor part (2) provided with a row of hinge eyes positioned in alignment, and an end hinge eye (7b) with an enlarged hinge hole (8b) which is positioned somewhat out of alignment and with a locking surface adjacent to the hinge hole and positioned in alignment The assembly further comprises a second part (3) such that the conveyor parts can cooperate in a coupled condition by receiving hinge eyes in corresponding interspaces, and a hinge pin provided with a central body part (3) such that the conveyor parts can cooperate in a coupled condition by receiving hinge eyes in corresponding interspaces and a hinge pin provided with a central body part (15) with a thickened head (16) which is able to pass the end hinge hole (8b), but not the next hinge hole (12) in coupled condition. In coupled condition the thickened head (16) is located between the end hinge eye and the next hinge eye (14) such that the hinge pin is axially locked between the e locking surface of the end hinge eye on the one side and the next hinge eye on the other side The thickened head (16) bears a projection which reaches into the hinge hole of end hinge eye in coupled condition.

13 Claims, 8 Drawing Sheets

U.S. PATENT DOCUMENTS

| | | | | |
|---|---|---|---|---|
| 4,709,807 A | * | 12/1987 | Poerink | 198/853 |
| 4,911,681 A | * | 3/1990 | Funkhouser | 474/145 |
| 5,573,106 A | * | 11/1996 | Stebnicki | 198/853 |
| 5,598,916 A | | 2/1997 | Horton et al. | |
| 5,645,160 A | | 7/1997 | Palmaer et al. | |
| 5,662,211 A | * | 9/1997 | Quentin | 198/853 |
| 5,678,683 A | * | 10/1997 | Stebnicki et al. | 198/853 |
| 5,826,705 A | * | 10/1998 | Ramsey et al. | 198/853 |
| 5,906,270 A | | 5/1999 | Faulkner | |
| 5,960,937 A | * | 10/1999 | Stebnicki et al. | 198/851 |
| 6,036,002 A | * | 3/2000 | Kobayashi et al. | 198/853 |
| 6,213,292 B1 | * | 4/2001 | Takahashi et al. | 198/853 |
| 6,308,825 B1 | * | 10/2001 | Nakamura | 198/853 |
| 6,499,587 B1 | * | 12/2002 | Greve | 198/853 |
| 7,108,127 B2 | * | 9/2006 | Krisl | 198/853 |
| 7,331,447 B2 | * | 2/2008 | Krisl et al. | 198/853 |

FOREIGN PATENT DOCUMENTS

EP      1 500 614      1/2005

* cited by examiner

ASSEMBLY FOR HINGEDLY COUPLING PARTS OF A CONVEYOR, AND HINGE PIN

The invention relates to an assembly for hingedly coupling parts of a conveyor, and to a hinge pin. With hingedly coupling parts of a conveyor, such as a conveyor mat or chain built up from modules, or a conveyor belt composed of one or more segments, conveyor parts are coupled with the aid of hinge pins. A problem that occurs therein is that the hinge pins need to be locked against axial migration.

In the prior art, many assemblies have already been proposed for this, such as plugs, detachable clips, non-detachable clips, integrated snap fingers, pins cooperating with stops and pins with thickened heads.

A very advantageous assembly is known from EP 0 787 663. In this assembly, with deformation of at least one of the conveyor parts to be coupled and/or the hinge pin, via an enlarged hinge hole, a pin with a thickened head is introduced into an end hinge eye which is somewhat out of alignment with respect to the other hinge eyes. After passing the enlarged hinge hole, pin and/or module return to their original form and the pin is axially locked between, on the one side, a locking surface of the end hinge eye in alignment with the other hinge eyes and, on the other side, the next hinge eye in coupled condition.

Due to the absence of separate parts and due to its good cleanability, this assembly is well suitable for conveyors in the food industry.

What is disadvantageous about the known assembly, however, is that it is difficult to detach after coupling. In order to enable a good detachability, an opening is provided in the conveying surface formed by the conveying parts, so that the thickened head is accessible from above to be engaged and to be slid out with deformation of the pin and/or the modules. This opening interferes with the possibility to design the conveying surface of the conveyor so as to be closed. The opening is then less favorable with a view to cleanability of the conveyor, since such an opening can locally cause contaminations.

A further drawback of the known conveyor is that the pin cannot extend to the side edge of the conveyor. Thus, a part of the width of the conveyor remains unused for transmitting tensile forces between the conveyor parts via the hinge pin. The invention contemplates an assembly for hingedly coupling parts of a conveyor with which, while maintaining the advantages, these drawbacks can be obviated. To this end, the invention provides an assembly for hingedly coupling parts of a conveyor, comprising a first conveyor part provided with a first row of hinge eyes spaced apart from one another with mutual interspaces with an end hinge eye located along a longitudinal edge of the conveyor part, with an end hinge hole which is somewhat out of alignment with respect to an adjacent hinge hole from the first row, further comprising a second conveyor part provided with a second row of hinge eyes which are also spaced apart from one another with mutual interspaces, such that the conveyor parts can cooperate in a coupled condition by receiving hinge eyes in corresponding interspaces, and a hinge pin provided with a central body part which extends, in coupled condition of the assembly, through hinge holes of the first row and of the second row, further provided with a thickened head which is able to pass the end hinge hole of the end hinge eye, but not the hinge hole of the next hinge eye in coupled condition, which thickened head is, in coupled condition, axially locked between the end hinge eye and the next hinge eye, while the thickened head bears a projection which reaches into the hinge hole of the end hinge eye in coupled condition. By using the projection, it is realized that the hinge pin can be engaged via the end hinge eye, so that the pin is accessible from the side of the conveyor in order to be detached. This cannot only facilitate the detachment, but also allows a closed design of the conveying surface of the conveyor. Further, in coupled condition, the projection can abut a part of the wall of the end hinge eye, so that the whole width of the conveyor can be used for transmitting tensile forces.

The invention further relates to a hinge pin for coupling conveyor parts, comprising a substantially elongated central body part with a thickened head, while the thickened head bears a narrowed projection.

Further advantageous embodiments of the invention are shown in the subclaims.

The invention will be elucidated in more detail with reference to an exemplary embodiment shown in the drawing, in which.

The Figures are only schematic representations of a preferred embodiment of the invention given by way of non-limitative exemplary embodiment. In the drawing, corresponding or same parts are designated by the same reference numerals.

Figure 1:
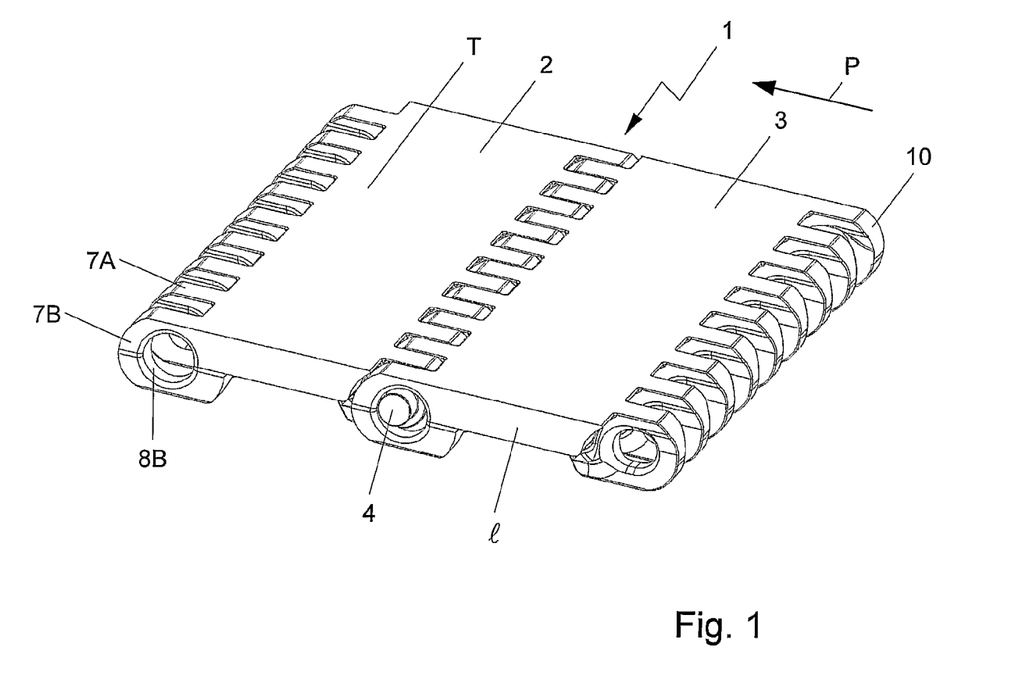
FIG. 1 shows a schematic perspective top plan view of two hingedly coupled conveying parts of a conveyor.
Figure 2:
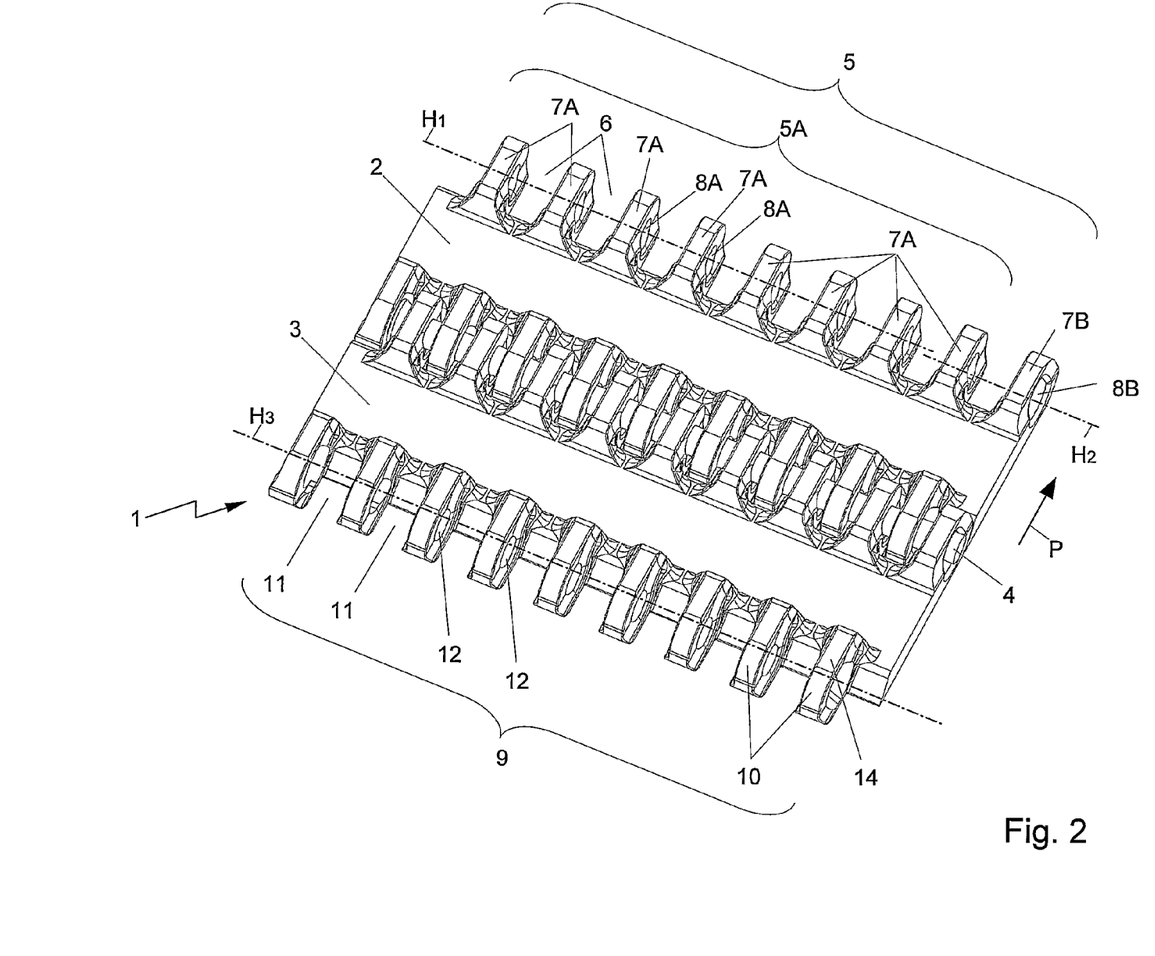
FIG. 2 shows a schematic perspective bottom view of the two hingedly coupled conveying parts of FIG. 1.

With reference to the Figures, in particular FIG. 1 and FIG. 2, therein an assembly 1 is shown for hingedly coupling parts of a conveyor. The assembly comprises a first conveying part 2, a second conveying part 3 and a hinge pin 4. In this exemplary embodiment, the first conveying part 2 and the second conveying part 3 are designed as successive modules of a modular conveyor mat. Such a conveyor mat is generally known and is usually built up from rows of one or more modules extending transverse to a conveying direction indicated by an arrow P, while rows of modules successive in conveying direction are often included in a mat so as to be staggered with respect to one another according to a brick pattern and the mat is often designed as an endless belt.

The first conveying part 2 is provided with a first row 5 with hinge eyes 7 spaced apart with mutual interspaces 6. The first row 5 comprises a sub-row 5A with more centrally located hinge eyes 7A. The more centrally located hinge eyes 7A of the sub-row 5A are provided with hinge holes 8A in alignment with respect to one another. In this exemplary embodiment, the hinge eyes 7 have identical designs and the mutual interspaces 6 between the hinge eyes 7 are equal. Here, the hinge holes 8A have a substantially cylindrical design along a common centerline $H_1$ and have substantially the same diameter. It will be clear that, within the scope of the invention, the shapes of the different hinge eyes 7 and/or their mutual interspaces 6 may be unequal, and that the shapes and the dimensions of the hinge holes 8A of the successive hinge eyes may vary or may at least be chosen differently than shown in the Figure.

The first row 5 of hinge eyes 7 further comprises an end hinge eye 7B adjacent to the sub-row 5A, which end hinge eye 7B is located on the longitudinal edge of the conveyor 1. The end hinge eye 7B is provided with an enlarged hinge hole 8B which is positioned somewhat out of alignment. In this exemplary embodiment, the hinge hole 8B with the enlarged design has a cylindrical design with a larger diameter than the other hinge holes 8A from the first row. With respect to the conveying surface formed by the top side of the conveyor, the centerline $H_2$ of the enlarged hinge hole 8B is located at the same height as the centerline $H_1$ of the hinge holes 8A, but extends parallel to the centerline $H_1$ through the hinge holes 8A, shifted in conveying direction over a distance E. The end hinge hole 7B is provided with a locking surface 20 which is adjacent to the enlarged hinge hole 8B and extends onto the line.

It is noted that, within the context of this application, the notion "positioned in alignment" is to be understood to mean that, transverse to the conveying direction, successive hinge holes can be aligned to let a hinge pin pass freely in extended condition and that "somewhat positioned in alignment" is to be understood to mean that such a hole cannot be passed without deformation of the hinge pin and/or at least one of the conveying parts. Such a passage without deformation is then prevented in that the body part of the hinge eye surrounding the non-aligned hinge hole extends onto the line of free passage of the hinge pin. In the English language, these notions are very well defined by the wording that the end hinge eye is in partial registry with the hinge eyes of the sub-row, and that the hinge pin is in interfering alignment with the hinge eye of the non-aligned hinge hole.

The second conveyor part 3 is provided with a second row 9 of hinge eyes 10 which are spaced apart with mutual interspaces 11 and which are provided with hinge holes 12 aligned with respect to one another. The hinge eyes 10, the interspaces 11 and the hinge holes 12 are identical to the hinge eyes 7A, the interspaces 6 and the hinge holes 8A of the first conveyor part 2. So, the hinge holes 12 of the hinge eyes 10 also have a cylindrical design and are on a common centerline $H_3$.

As FIG. 1 clearly shows, the conveying parts 2, 3 can cooperate in coupled condition in that hinge eyes 7 of a module designed as a first conveying part, which extend in a conveying direction indicated by the open part of arrow P and reach forwards, are included in interspaces 11 between hinge eyes 10 reaching backwards of the second conveying part 3 succeeding in conveying direction and designed as a similar module. In a same manner, hinge eyes 10 of the second row are included in interspaces 6 between the hinge eyes of the first row 5.

The hinge pin 4 is provided with a central body part 15. In coupled condition of the assembly, the central body part 15 extends through the hinge holes 8A of the hinge eyes 7A of sub-row 5A and through the hinge holes 13 of the hinge eyes 10 of the second row 9, such that the centerline of the hinge pin $H_4$ runs substantially parallel between the centerlines $H_1$ and $H_3$ of the hinge holes 8A, 12 of the cooperating hinge eyes 7A, 10.

The hinge pin 4 is provided with a thickened head 16 which is able to pass the enlarged end hinge hole 8B of the end hinge eye 7B, but is not able to pass the next hinge eye in coupled condition. In this exemplary embodiment, with the aid of its thickened head 16, the hinge pin 4 is thus axially locked between the locking surface 20 of the end hinge eye 7B on the one side and the next hinge eye 14 in coupled condition, herein formed by the hinge eye 10 bounding the second row 19, on the other side.

The thickened head 16 forms a part of the pin 4 with a larger diameter than the body part 15 of the pin 4 and has a conical design in this exemplary embodiment. As a result, at the location of the thickened head 16, the pin 4 has an enlarged diameter. The head 16 tapers towards the central part. The outer surface 17 of the cone cooperates with a corresponding cone stop surface 18 which is recessed in the hinge eye 14.

Further, an end surface 21 of the thickened head 16 cooperates with the locking surface 20, so that the hinge pin 4 is locked against axial migration.

It is noted that it is also possible to increase the interspace between the end hinge eye 7B and the bounding hinge eye 7A' of the sub-row 5A, so that providing a recess in the bounding hinge eye 14 of the first row is not necessary. It is also possible to omit the bounding hinge eye of the second row 9. In such a case, the next hinge eye with which the head cooperates is identical to the bounding hinge eye 7A of the sub-row 5A.

The thickened head 16 bears a projection 19 designed with a smaller diameter compared to the head, which projection 19 extends into the hinge hole 8B of the end hinge eye 7B in coupled condition. The projection 19 is narrowed compared to the head 16 and reaches axially outwards from the head 16 in a direction away from the body part 15.

The projection 19 is substantially cylindrical and has the same diameter as the body part 15 of the hinge pin 4. The projection 19 extends collinear with the central body part 15 of the hinge pin 4. In this manner, a part of the outer surface of the projection 19 abuts the wall of the enlarged hole 8B in the end hinge eye 7B, so that the end hinge eye 7B can also be used for transmitting tensile force. In the exemplary embodiment shown, the hinge pin 4 extends over the whole width of the conveyor 1.

It is noted that the thickened head may of course have a different shape, for instance a sphere, a cylinder or a block shape.

However, the conical shape shown in the exemplary embodiment is preferred because it can easily be introduced and further offers a good extent of locking.

Figure 5:
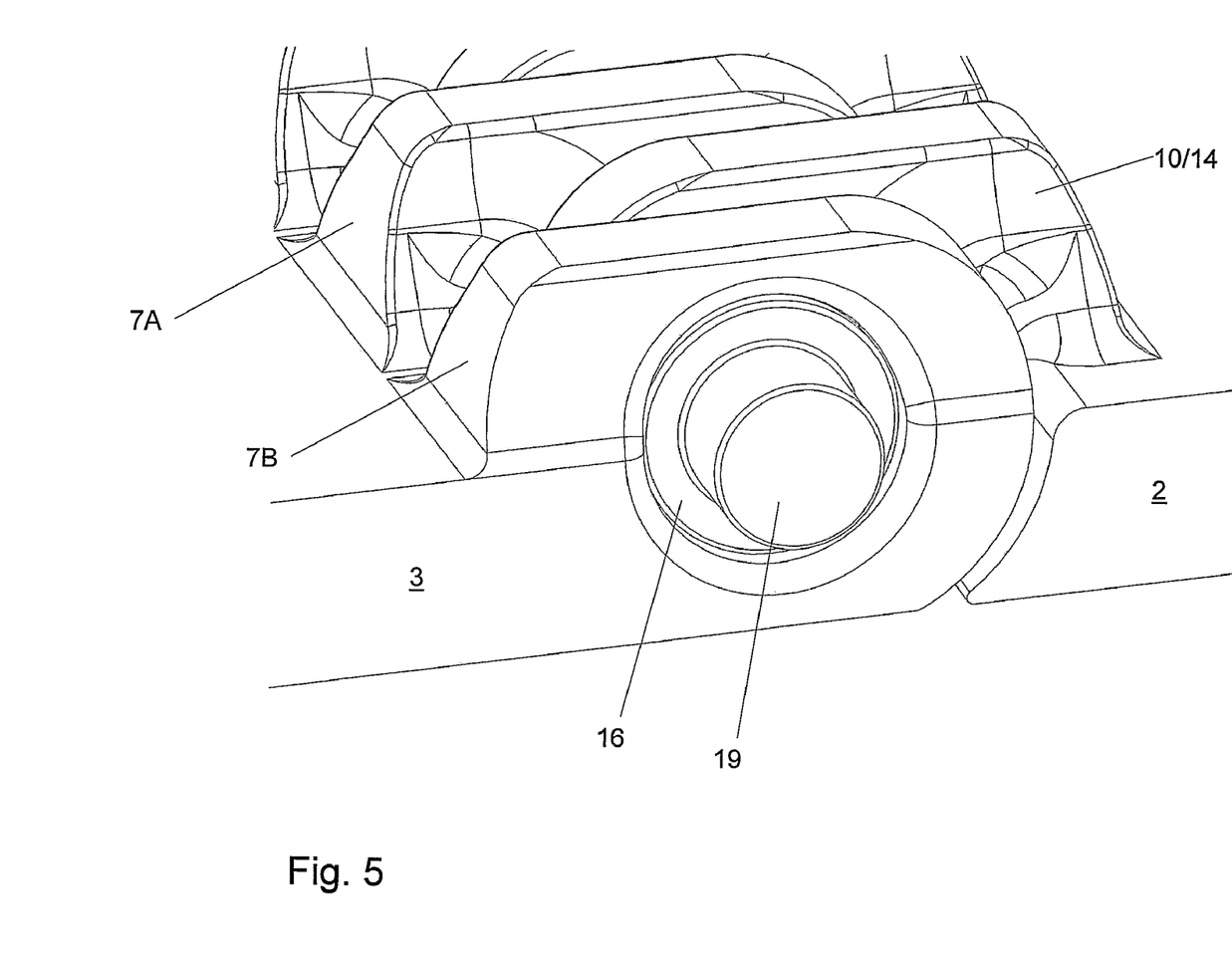
Figure 6:
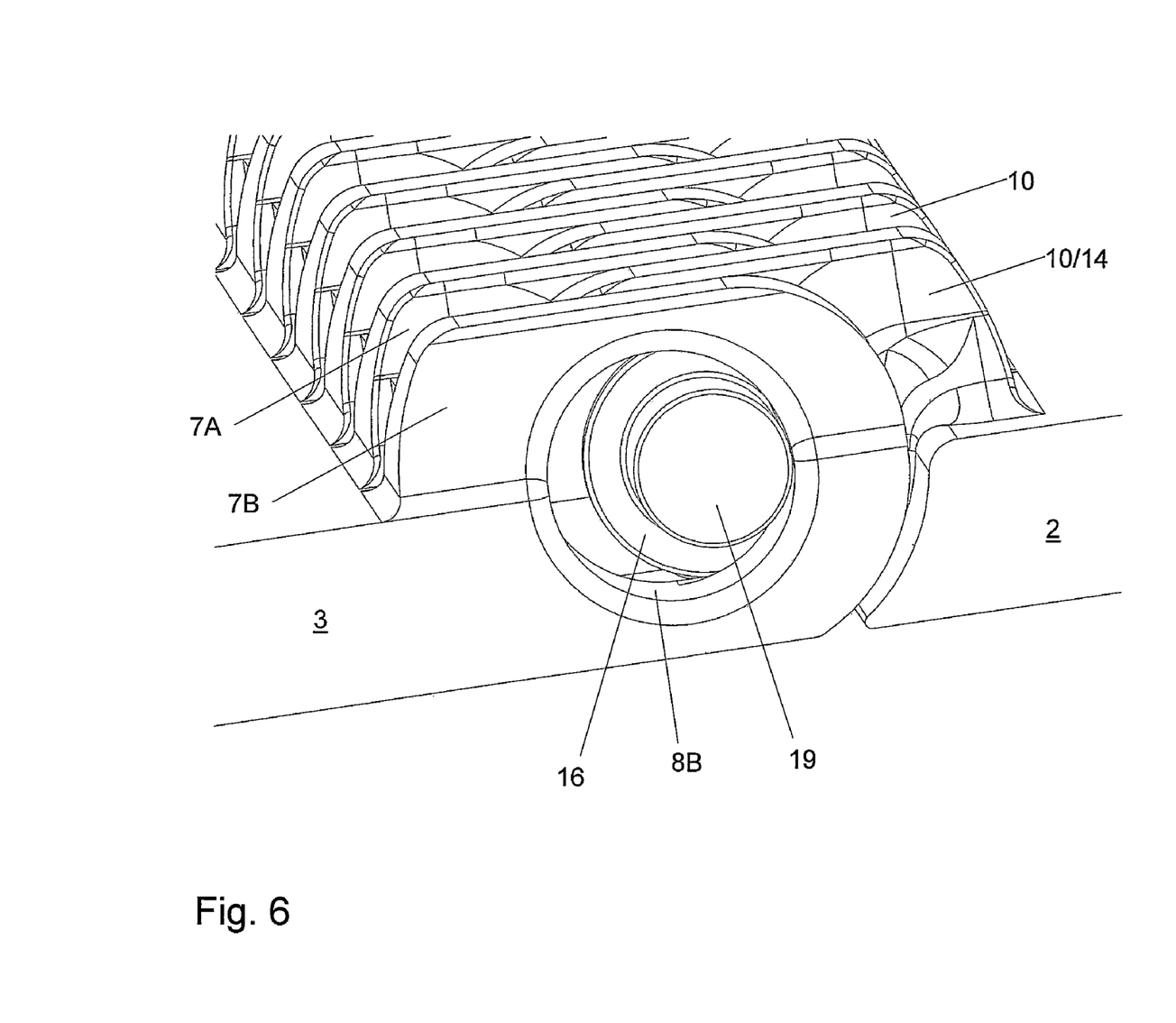
Figure 7:
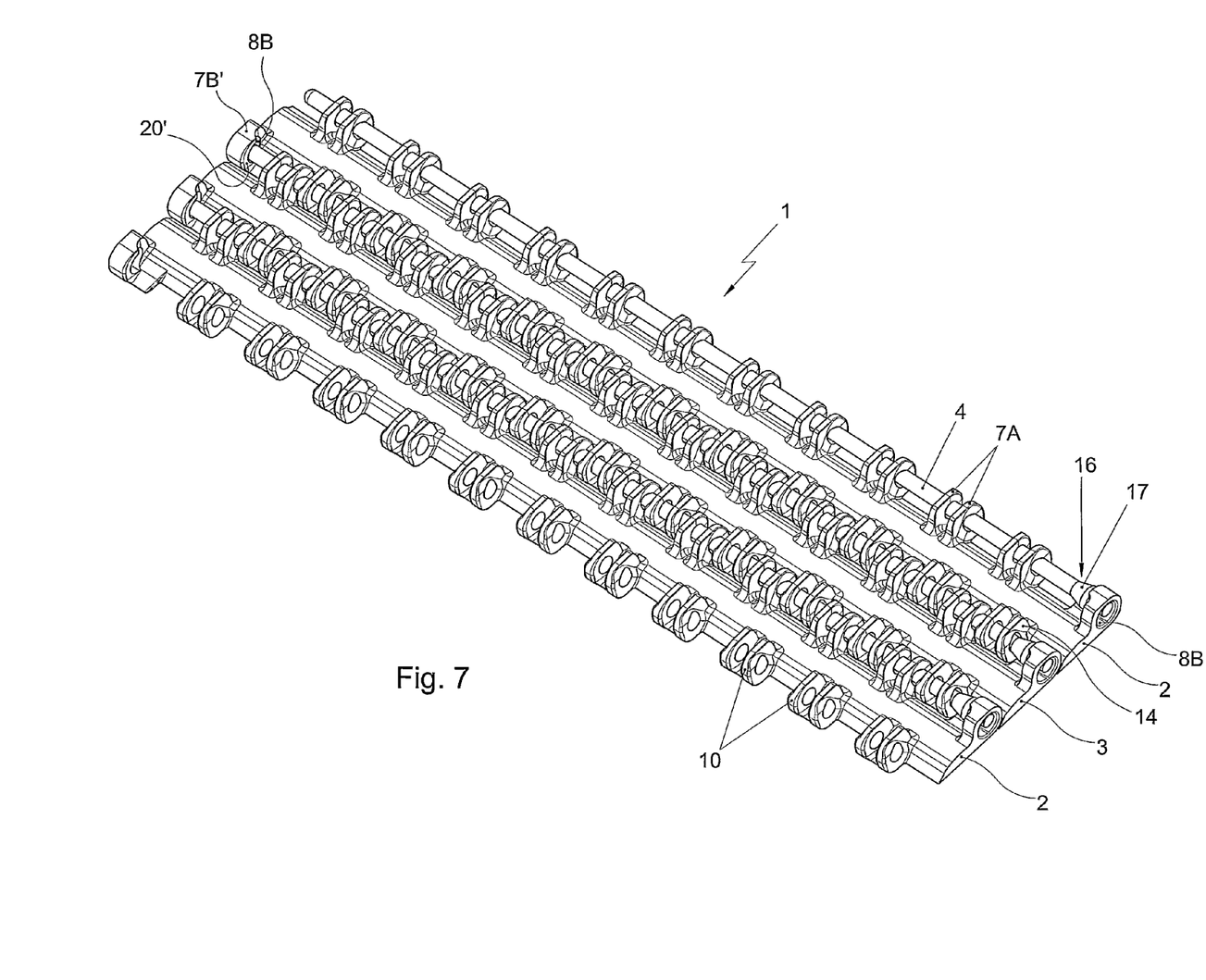
FIG. 7 shows a schematic perspective view of a first variant of an alternative embodiment of a conveying part in which the end hinge eye is partly reduced.

With reference to FIGS. 5-7, these show that the pin 4 can be introduced in the direction indicated by the arrow Q transverse to the conveying direction. During the introduction, as shown in FIG. 5, the central body part 15 can be threaded through the hinge holes 8, 12 up to the thickened head without bending of the pin 4. Upon reaching the thickened head 16, the pin 4 will bend slightly outwards and sidewards at the location of the head 16 (FIG. 5). As a result, the thickened head 16 can just pass the enlarged hinge hole 8B, which is somewhat staggered. After the thickened head 16 has passed the enlarged hole 8B, the pin 4 will spring back again and the thickened head 16 is locked as shown in FIG. 6. In coupled condition, the thickened head 16 is thus located between the end hinge eye 7B and the next hinge eye 14. With the aid of its thickened head 16, the hinge pin 4 is locked in a first axial direction between the locking surface 20 of the end hinge eye 7B which cooperates with the end surface 21 of the thickened head 16. In opposite axial direction, the hinge eye is locked in that the conical outer surface 17 of the thickened head 16 cooperates with the cone stop surface 18 of the hinge eye 14.

Detaching the pin 4 can be carried out by engaging the projection 19 of the pin 4 with the aid of a pair of pincers at the location of the longitudinal edge of the conveyor 1 and, after bending of the pin 4, pulling the thickened head 16 out via the large hole 8B of the end hinge eye 7B. Then the pin can spring back and be pulled back in extended condition.

Figure 3:
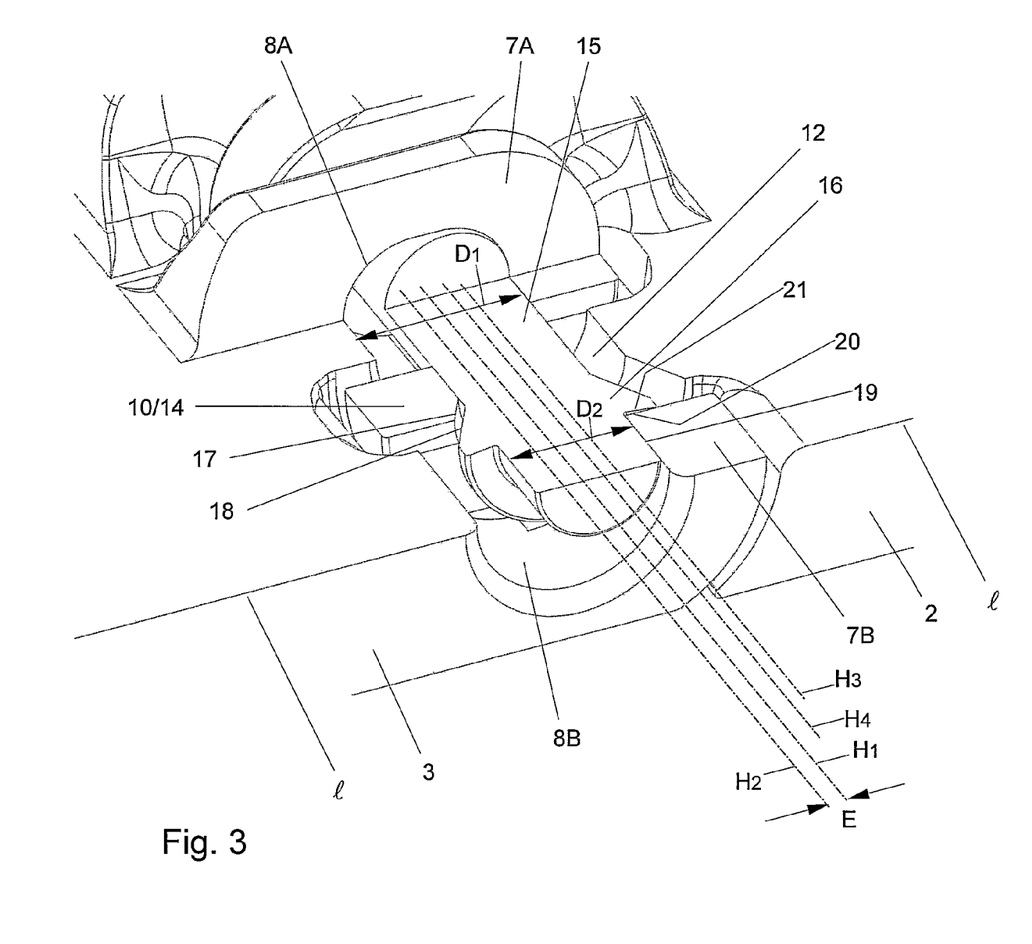
FIG. 3 shows a detail of the end of the conveying parts of FIG. 2 at a different angle in partial cross section.
Figure 4:
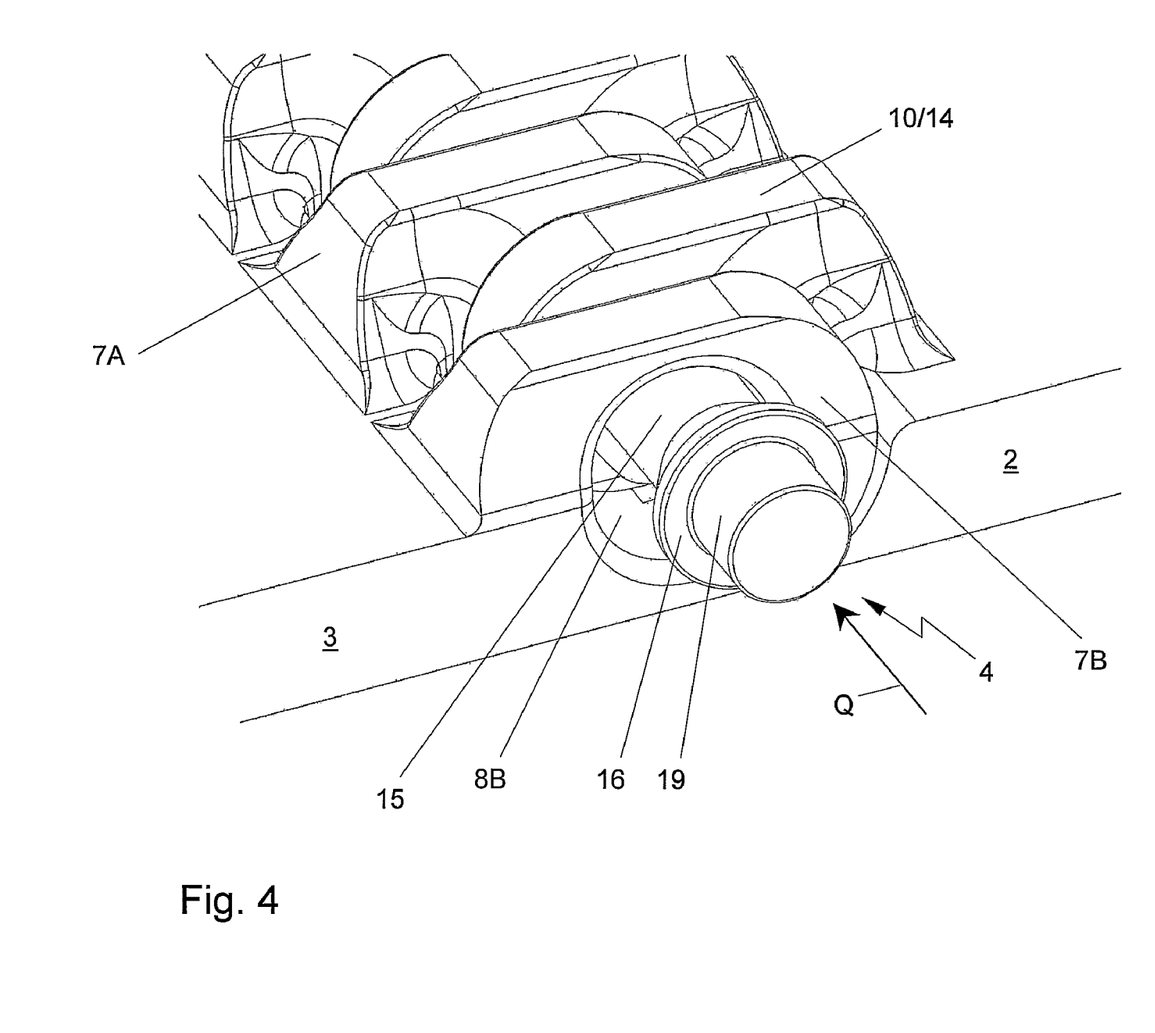
FIGS. 4-6 each show a schematic perspective bottom view in detail of two conveying parts during successive steps of coupling with the hinge pin.

FIG. 3 shows that the diameter D2 of the hole in the end hinge eye is larger than the diameter D1 of the other hinge eyes. It further shows that the centerline $H_2$ of the hole 8B of the end hinge eye 7B is shifted over a distance E parallel to the conveying surface T.

The hinge pin 4 is preferably designed from plastic, preferably from thermoplastic material by means of injection molding or extrusion. The thickened head may for instance be formed by upsetting the pin, but may also be molded integrally therewith. It is further possible to form the thickening with the aid of a separate part, such as for instance a bead, which is connected with the pin, for instance by gluing, welding or melting. In such a case, the thickened part 16 may for instance be designed from a different type of material, for instance from metal and may optionally have a thin-walled design.

In this manner, the pin 4 can be retrieved from the side of the conveyor 1 without any special tools. As the Figures show, the conveying surface T of the conveyor 1 formed by the top surfaces of the conveying parts 2, 3 can have a substantially closed design and recesses in the conveying surface for making the thickened head 16 accessible can be avoided.

In order to further increase the cleanability, in an alternative embodiment, the end hinge eye 7B can partly be reduced. In a first variant, as shown in FIG. 7, the locking surface 20' interrupted by the reduction surrounds the end hinge hole 8B as an interrupted ring segment radially contiguous with the hinge hole 8B.

Figure 8:
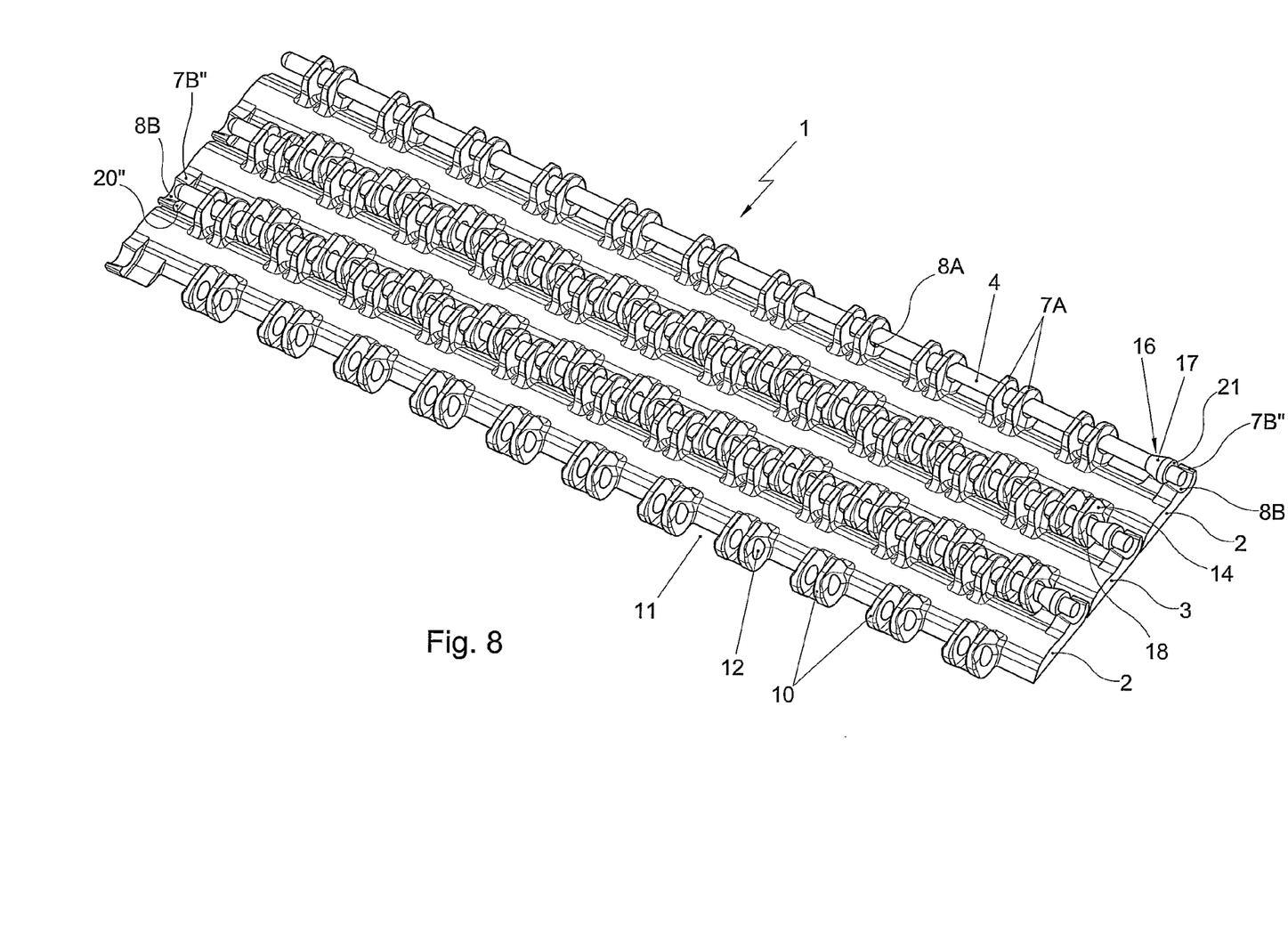
FIG. 8 shows a schematic perspective view of a second variant of an alternative embodiment in which the end hinge eye is designed as a stop cam.

In a second variant, the end hinge eye 7B is still further reduced so that it is designed as a stop cam 7B" reaching outwards with respect to the body part 15 of the conveying part 2, leaving a space corresponding with the end hinge hole 8B clear. The stop cam 7B" carries the locking surface 20". The space corresponding with the end hinge hole 8B can be positioned in alignment with the other hinge holes 8A.

In these alternative embodiments, the hinge pin 4 is locked against axial migration in that, with the aid of its thickened head 16, it is axially locked between the locking surface 20 cooperating with the end surface 21 of the thickened head 16 on the one side and the stop surface 18 of the next hinge eye 14 in coupled condition of the conveying parts 2, 3, which coincides with the outer surface 17 of the thickened head on the other side.

Thus, an assembly for hingedly coupling parts of a conveyor is provided, comprising a first conveyor part provided with a first row of hinge eyes spaced apart from one another with mutual interspaces with an end hinge eye located along a longitudinal edge of the conveyor part, with an end hinge hole which is somewhat out of alignment with respect to an adjacent hinge hole from the first row, further comprising a second conveyor part provided with a second row of hinge eyes which are also spaced apart from one another with mutual interspaces, such that the conveyor parts can cooperate in a coupled condition by receiving hinge eyes in corresponding interspaces, and a hinge pin provided with a central body part which extends, in coupled condition of the assembly, through hinge holes of the first row and of the second row, further provided with a thickened head which is able to pass the end hinge hole of the end hinge eye, but not the hinge hole of the next hinge eye in coupled condition, which thickened head is, in coupled condition, axially locked between the end hinge eye and the next hinge eye, while the thickened head bears a projection which reaches into the hinge hole of end hinge eye in coupled condition.

It will be clear that the invention is not limited to the exemplary embodiment shown herein. For instance, the conveyor parts may also be designed as chain modules of a modular conveyor chain. Further, the first and second conveyor parts may form ends of one conveyor mat segment which is coupled into an endless belt or the first and second conveying parts may form the beginning and the end of intercoupled conveyor belt segments, respectively. Further, across the width of the conveyor, multiple pins may be provided, for instance a relatively short locking pin with thickened head on a longitudinal edge and one or more longer, cylindrical additional pins. In this manner, a conventional locking pin can relatively simply be deployed for conveyors of different widths.

Such variants will be clear to a skilled person and are understood to be within the scope of the invention as set forth in the following claims.

The invention claimed is:

1. An assembly for hingedly coupling parts of a conveyer, comprising a first conveyor part provided with a first row of hinge eyes spaced apart from one another with mutual interspaces with an end hinge eye located along a longitudinal edge of the conveyor part, with an end hinge hole which is somewhat out of alignment with respect to an adjacent hinge hole from the first row, further comprising a second conveyor part provided with a second row of hinge eyes which are also spaced apart from one another with mutual interspaces, such that the conveyor parts can cooperate in a coupled condition by receiving hinge eyes in corresponding interspaces, and a hinge pin provided with a central body part which extends, in coupled condition of the assembly, through hinge holes of the first row and of the second row, further provided with a thickened head which is able to pass the end hinge hole of the end hinge eye, but not the hinge hole of the next hinge eye in a coupled condition, which thickened head is, in coupled condition, axially locked between the end hinge eye and the next hinge eye, while the thickened head bears a projection extending from the thickened head, wherein the projection has a constant diameter that is less than the diameter of the thickened head along the entire length of said projection, which reaches into the hinge hole of the end hinge eye in coupled condition.

2. An assembly according to claim 1, wherein the first row comprises a sub-row with more centrally located hinge eyes with hinge holes aligned with respect to one another and an end hinge eye adjacent to the sub-row, with an enlarged hinge hole which is positioned somewhat out of alignment and with a locking surface adjacent to the hinge hole and positioned in alignment.

3. An assembly according to claim 1, wherein the hinge eyes of the hinge holes of the second row are provided with hinge holes aligned with respect to one another.

4. An assembly according to claim 1, wherein, with the aid of its thickened head, the hinge pin is axially locked between a locking surface of the end hinge eye on the one side of the next hinge eye on the other side.

5. An assembly according to claim 1, wherein the projection is substantially cylindrical.

6. An assembly according to claim 1, wherein the projection has substantially the same diameter as the body part of the pin.

7. An assembly according to claim 1, wherein the projection extends collinear with the central part of the pin.

8. An assembly according to claim 1, wherein the hinge pin is rotationally symmetrical.

9. An assembly according to claim 1, wherein the pin extends over the width of the conveyor.

10. An assembly according to claim 1, wherein the thickened head tapers from the projection towards the central part.

11. An assembly according to claim 1, wherein the cooperating conveyor parts form a substantially closed conveying surface.

12. An assembly according to claim 1, wherein the end hinge eye is partly reduced, so that the locking surface surrounds the hinge hole as a ring segment.

13. An assembly according to claim 1, wherein the end hinge eye is designed as a stop cam bearing the locking surface and reaching outwards with respect to the body part, leaving a space corresponding with the hinge hole clear.

* * * * *